United States Patent
Sasaki et al.

(10) Patent No.: US 6,891,556 B2
(45) Date of Patent: May 10, 2005

(54) IMAGE PRINTING METHOD AND APPARATUS

(75) Inventors: Takashi Sasaki, Kanagawa (JP); Hiroshi Kyogoku, Kanagawa (JP); Yoshinobu Shiraiwa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/100,138

(22) Filed: Mar. 19, 2002

(65) Prior Publication Data

US 2002/0135631 A1 Sep. 26, 2002

(30) Foreign Application Priority Data

Mar. 23, 2001 (JP) .......................................... 2001-085526

(51) Int. Cl.$^7$ ................................................. B41J 2/36
(52) U.S. Cl. ......................................................... 347/192
(58) Field of Search ................................. 347/192, 193, 347/14, 16, 19, 190, 195, 215

(56) References Cited

U.S. PATENT DOCUMENTS

| | | | |
|---|---|---|---|
| 4,328,507 A | 5/1982 | Kyogoku | 347/37 |
| 4,352,114 A | 9/1982 | Kyogoku et al. | 347/14 |
| 4,510,505 A * | 4/1985 | Fukui | 347/490 |
| 4,639,747 A | 1/1987 | Sakurada et al. | 347/12 |
| 4,682,186 A | 7/1987 | Sasaki et al. | 347/15 |
| 4,746,931 A * | 5/1988 | Okuda | 347/193 |
| 4,843,409 A * | 6/1989 | Matsuzaki | 347/172 |
| 5,192,959 A | 3/1993 | Drake et al. | 347/42 |
| 5,204,736 A * | 4/1993 | Abe | 358/500 |
| 5,214,446 A * | 5/1993 | Mitsuda | 347/184 |
| 5,349,905 A * | 9/1994 | Taylor et al. | 101/488 |
| 5,373,312 A * | 12/1994 | Fujioka et al. | 347/102 |
| 5,524,993 A * | 6/1996 | Durst | 400/279 |
| 5,806,993 A * | 9/1998 | Petterutti et al. | 400/88 |
| 5,815,191 A * | 9/1998 | Michielsen et al. | 347/188 |
| 6,234,695 B1 | 5/2001 | Freedman et al. | 400/120.01 |

FOREIGN PATENT DOCUMENTS

EP    0 390 444    10/1990

* cited by examiner

*Primary Examiner*—Lamson Nguyen
*Assistant Examiner*—Blaise Mouttet
(74) *Attorney, Agent, or Firm*—Fitzpatrick, Cella, Harper & Scinto

(57) ABSTRACT

In order to print an image at a high speed without using any large-capacity power supply unit, the image to be printed is segmented into grayscale-specific areas before printing, and the cumulative number of printing elements required to print the respective grayscale-specific areas is counted to predict a necessary power. On the basis of the prediction result, the image is then printed by selecting the highest convey speed from convey speeds at which upper limit powers used and rated average power consumption are determined. This makes it possible to provide an image printing method and apparatus which can realize high-speed image printing.

15 Claims, 9 Drawing Sheets

$A_1$ : AREA WITH YELLOW DENSITY OF 1.0

$B_1$, $B_2$, $B_3$ : AREA WITH YELLOW DENSITY OF 2.0

YELLOW DENSITY OF 1.0 : YELLOW DENSITY OF 2.0 = 3 : 1

$A_1$, $A_2$ : AREA WITH YELLOW DENSITY OF 2.0

$B_1$, $B_2$ : AREA WITH YELLOW DENSITY OF 1.0

YELLOW DENSITY OF 1.0 : YELLOW DENSITY OF 2.0 = 1 : 1

STROBE PULSE FOR PORTION WITH YELLOW DENSITY OF 2.0

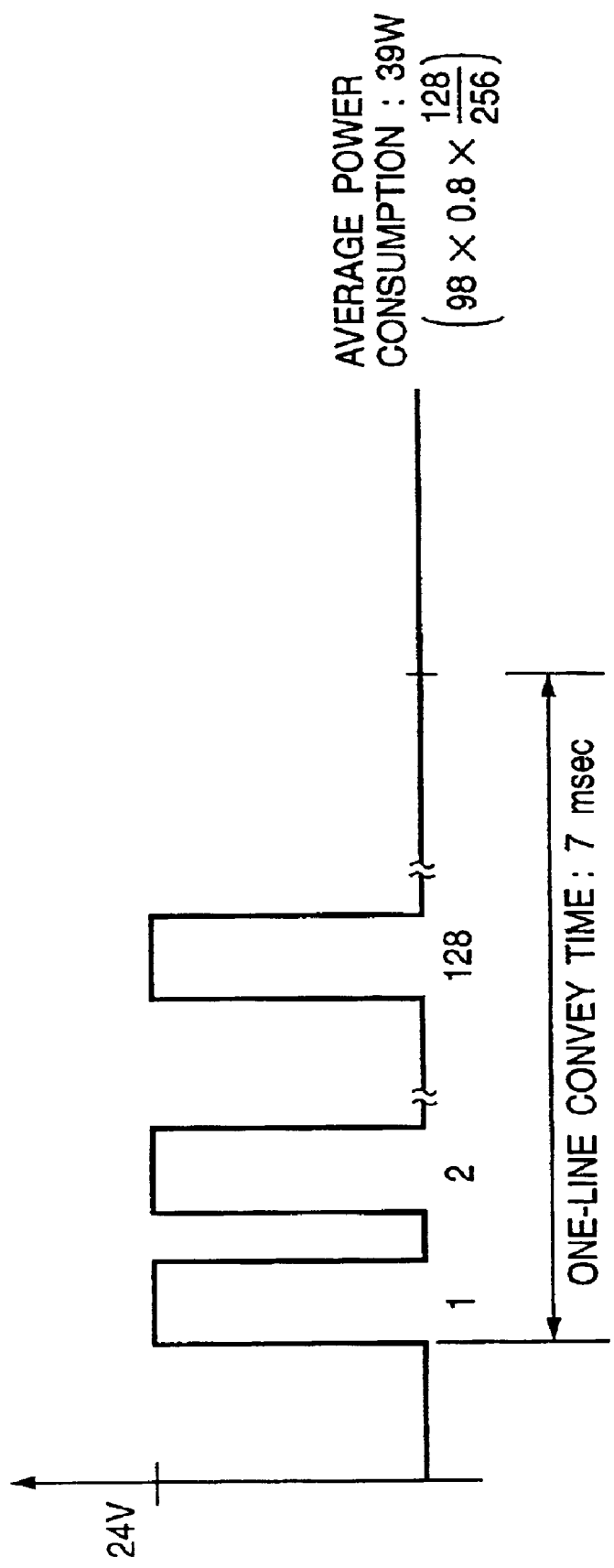

IMAGE PRINTING METHOD AND APPARATUS

FIELD OF THE INVENTION

The present invention relates to an image printing method and apparatus and a storage medium and, more particularly, to a thermal transfer or sublimation-type image printing method and apparatus which perform image printing at a high speed and a storage medium.

BACKGROUND OF THE INVENTION

In an image printing apparatus which serves as an information output apparatus for a wordprocessor, personal computer, facsimile apparatus, or the like and is designed to print information such as desired characters and images on a sheet-like printing medium such as a paper sheet or film, a serial printing scheme of printing images while reciprocally scanning in a direction perpendicular to the feed direction of a printing medium such as a paper sheet is widely used owing to its advantages such as low cost and compactness.

One problem that arises when an image is printed at a high speed by using a thermal transfer or sublimation-type image printing apparatus will be described below.

In general, when images are to be printed on the same printing media, each constituted by an image-receiving sheet and ink, which have the same sensitivity, by using a thermal transfer or sublimation-type image printing apparatus, a larger amount of power is required.

This is because in a thermal transfer or sublimation-type image printing apparatus, the energy supplied per unit area of printing medium such as a image receiving sheet for the unit time remains unchanged, and hence a larger amount of power must be supplied in proportion to the image printing amount in printing images on many areas at a high speed.

A power supply unit capable of supplying a large amount of power for the unit time is expensive. This inevitably becomes a factor that increases the cost of an image printing apparatus. For this reason, in the prior art, a high-speed image printing apparatus equipped with such a large-capacity power supply unit has been limited to an image printing apparatus for business use, which gives higher priority to performance than cost to a certain extent and is used to print certificates, seals, and the like.

Recently, with the widespread use of digital cameras, there is an increasing need to print images obtained by digital cameras with ease at a high speed at home. A thermal transfer or sublimation-type image printing apparatus is suitable for such use.

In order to manufacture a thermal transfer or sublimation-type image printing apparatus for which the above requirement for high speed is imposed, the problems associated with manufacturing cost must be solved.

SUMMARY OF THE INVENTION

The present invention has been made to solve the above problems in the prior art, and has as its object to provide an image printing method and apparatus which can print an image at a high speed without requiring any expensive, large-capacity power supply unit.

In order to achieve the above object, an image printing apparatus according to an embodiment of the present invention has the following arrangement. There is provided an image printing apparatus which has a printhead having a plurality of printing elements arrayed in a predetermined direction and prints an image by conveying a printing medium in a direction crossing the array direction at a right angle, characterized by comprising power predicting means for predicting a power to be supplied to the printhead in printing the image on the basis of image data, convey speed selecting means for selecting a convey speed for the printing medium on the basis of the predicted power, and image printing means for printing the image at the selected convey speed.

For example, the power predicting means segments the image into grayscale-specific image areas on the basis of the image data, counts the numbers of printing elements required to print the image areas, and predicts the power from a cumulative value of the numbers of printing elements obtained for the respective grayscales.

In addition, for example, the image is a color image printed by using a plurality of inks, and the grayscale is divided for the respective types of inks.

Furthermore, for example, the image is a color image printed by using a plurality of inks, and the grayscale is a color grayscale formed by mixing the plurality of inks.

Moreover, for example, the image printing apparatus comprises a plurality of printheads each identical to the printhead, and the power predicting means is provided for each of the printheads.

For example, different convey speeds and upper limit powers used at the respective convey speeds are registered in the convey speed selecting means, and the convey speed selecting means selects a highest convey speed from convey speeds of the convey speeds at which powers required to print the image do not exceed the upper limit power used.

In order to achieve the above object, a control method for an image printing apparatus according to an embodiment of the present invention has the following steps. There is provided a control method for an image printing apparatus which has a printhead having a plurality of printing elements arrayed in a predetermined direction and prints an image by conveying a printing medium in a direction crossing the array direction at a right angle, characterized by comprising the power predicting step of predicting a power to be supplied to the printhead in printing the image on the basis of image data, the convey speed selecting step of selecting a convey speed for the printing medium on the basis of the predicted power, and the image printing step of printing the image at the selected convey speed.

In order to achieve the above object, a computer-readable storage medium according to an embodiment of the present invention has the following arrangement. There is provided a computer-readable storage medium characterized by storing a control program for the image printing apparatus control method for an image printing apparatus which has a printhead having a plurality of printing elements arrayed in a predetermined direction and prints an image by conveying a printing medium in a direction crossing the array direction at a right angle, the control program comprising, the power predicting step of predicting a power to be supplied to the printhead in printing the image on the basis of image data, the convey speed selecting step of selecting a convey speed for the printing medium on the basis of the predicted power, and the image printing step of printing the image at the selected convey speed.

Other features and advantages of the present invention will be apparent from the following description taken in conjunction with the accompanying drawings, in which like

BRIEF DESCRIPTION OF THE DRAWINGS

The accompanying drawings, which are incorporated in and constitute a part of, the specification, illustrate embodiments of the invention and, together with the description, serve to explain the principles of the invention.

FIG. 9 is a timing chart for explaining the number of strobe pulses and average power consumption that are required to print the portion with the area A2.

DETAILED DESCRIPTION OF THE PREFERRED EMBODIMENTS

Preferred embodiments of the present invention will be described in detail in accordance with the accompanying drawings.

In this embodiment, a sublimation-type image printing apparatus 100 will be described as an image printing apparatus. However, the scope of the present invention is not limited to this.

[Brief Explanation of Apparatus Body]

Figure 1:
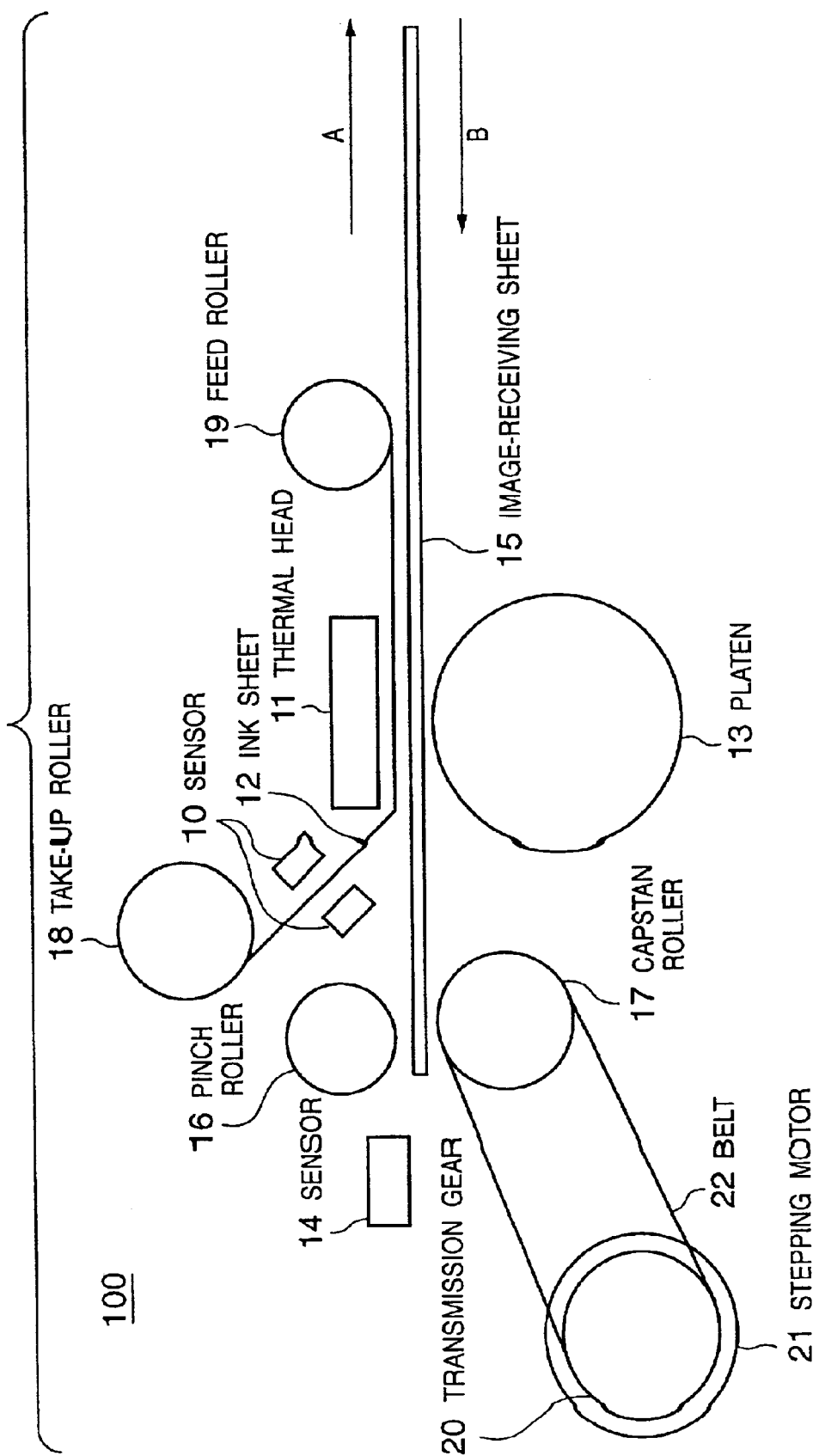
FIG. 1 is a view showing the schematic arrangement of a sublimation-type image printing apparatus according to an embodiment of the present invention.

FIG. 1 is a view for explaining the schematic arrangement of the sublimation-type image printing apparatus 100 viewed from its side surface.

Yellow, magenta, and cyan ink sheets 12 arranged in the order named and an image-receiving sheet 15 are positioned between a platen 13 and a thermal head 11 having many printing elements arrayed in accordance with a print density.

The thermal head 11 is designed to be pressed against the platen 13 and separated therefrom by a driving unit (not shown). The platen 13 has a surface with high smoothness which movably presses the image-receiving sheet 15 and ink sheets 12 again the thermal head 11.

The ink sheets 12 are wound around a feed roller 19 at first and are sequentially taken up by a take-up roller 18. The ink sheets 12 are normally wound around the feed roller 19 in advance and supplied in the form of a cassette incorporating the feed roller 19 and take-up roller 18.

The image-receiving sheet 15 is conveyed by a capstan roller 17 through a pinch roller 16. The capstan roller 17 is driven through a transmission gear 20 directly coupled to a stepping motor 21 and a belt 22.

The take-up roller 18 is driven through a DC motor and torque limiter (not shown). With this arrangement, the moving amount of the image-receiving sheet 15 matches the moving amount of the ink sheets 12.

With the above arrangement, the moving speed of the image-receiving sheet 15 and ink sheets 12 can be arbitrarily changed by changing the rotational speed of the stepping motor 21, i.e., the period of a driving pulse. In addition, this apparatus includes a sensor 14 for detecting the leading end of an image-receiving sheet 15 and a sensor 10 for detecting a cueing marker of each ink sheet 12.

[Arrangement of Control System]

Figure 2:
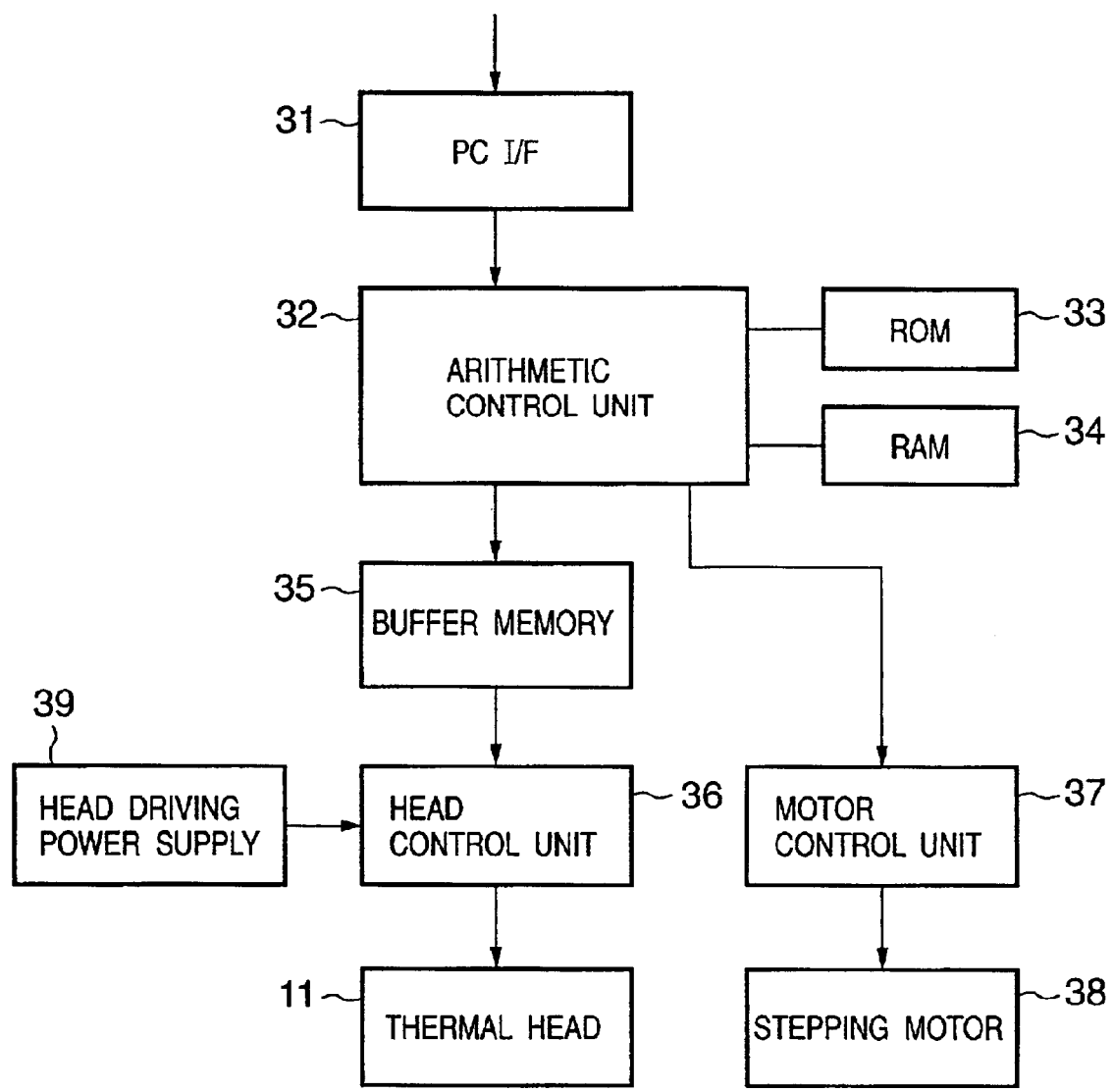
FIG. 2 is a block diagram showing the schematic arrangement of the control unit of the sublimation-type image printing apparatus according to the embodiment of the present invention.

FIG. 2 is a block diagram showing the arrangement of the control system of the sublimation-type image printing apparatus 100. A PC I/F 31 receives image data and control commands transmitted from a personal computer PC (not shown) and transmits them to an arithmetic control unit 32.

The arithmetic control unit 32 performs necessary image processing and controls the thermal head 11 and stepping motor 21 by executing programs for sequences (to be described later) stored in a ROM 33. The arithmetic control unit 32 generates a driving pulse signal having a period corresponding to the convey speed determined by a method (to be described later), and supplies it to a motor control unit 37.

The motor control unit 37 generates a driving pulse synchronized with this driving pulse signal to actually drive a stepping motor 38.

When printing an image is to be performed on the condition of a feed density of 300 DPI in the sub-scanning direction, a convey speed of 7 msec/line and four steps per one line, the driving pulse period per one step driving becomes 1.75 msec, and the image-receiving sheet 15 and each ink sheet 12 move by 21 $\mu$m per pulse. If one-line driving is to be performed at double the speed, the driving pulse period may be set to 0.875 msec.

A head control unit 36, supplied with power by a head driving power supply 39, converts density data stored in a buffer memory 35 into the number of strobe pulses, and drives the thermal head 11 at a driving voltage (e.g., 24 V) to print an image. This operation will be described in detail later.

[Flow of Image Printing]

Figure 3:
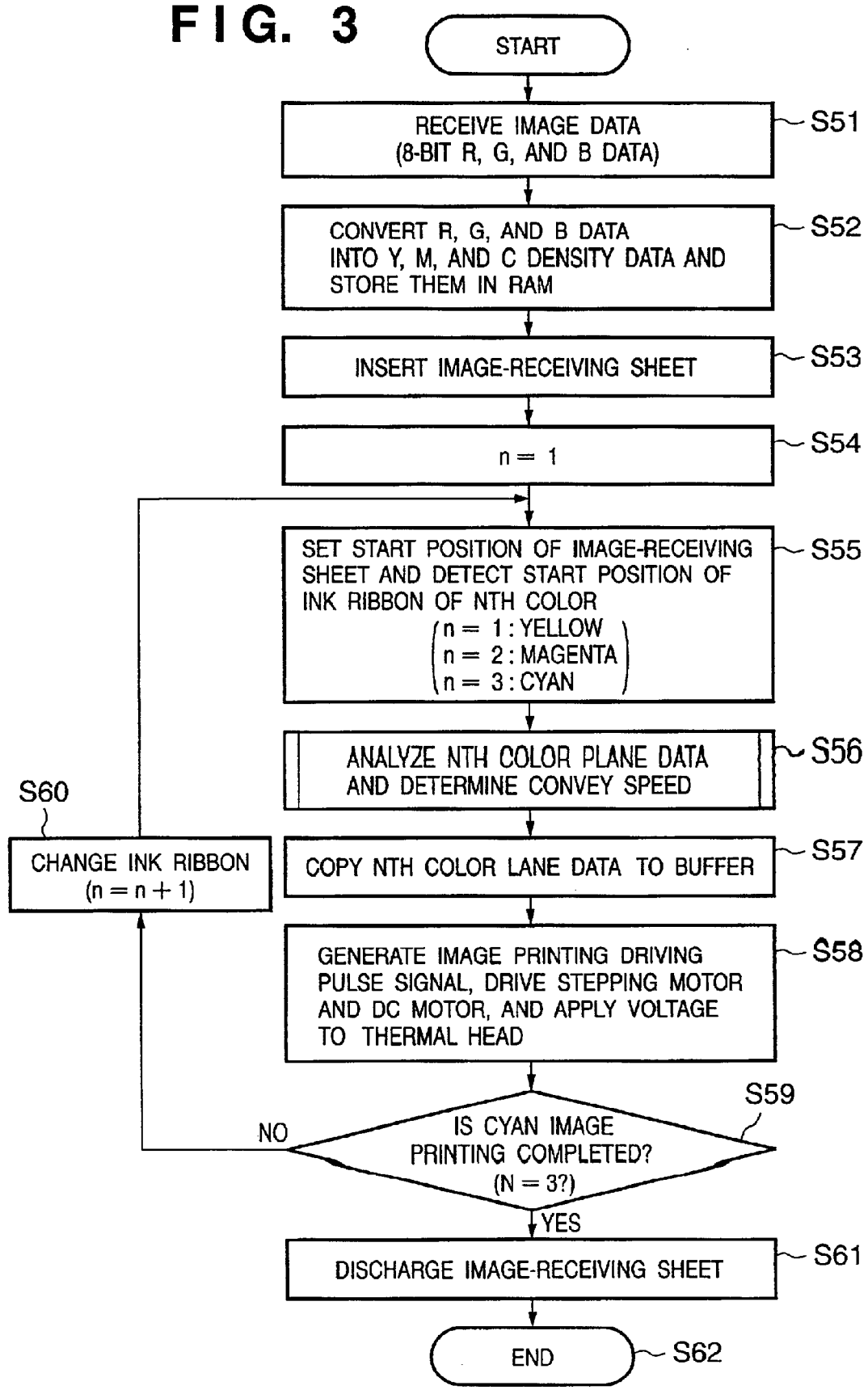
FIG. 3 is a flow chart showing an outline of overall operation of the embodiment of the present invention.

FIG. 3 is a flow chart showing the flow of image printing operation by the sublimation-type image printing apparatus 100 (arithmetic control unit 32).

In step S51, image data to be printed is received from the personal computer PC (not shown) through the PC I/F 31. This embodiment will exemplify the case where R, G, and B image data each consisting of eight bits are received. However, image data in other forms, e.g., YCrCb image data, can also be used.

When YCrCb image data is to be used, this data may be converted into RGB data by matrix computation or the like.

In step S52, the received R, G, and B image data each consisting of eight bits are converted into yellow (Y), magenta (M), and cyan (C) density data by an appropriate conversion scheme. The conversion result is temporarily written and stored in a RAM 34.

For the sake of simplicity, this embodiment will exemplify the conversion method used when the number of input pixels coincides with the number of output pixels in the image printing apparatus. Even if, however, the number of input pixels differs from the number of output pixels, conversion can be done.

If the above numbers differ from each other, the received data may be converted into YMC data corresponding to the number of pixels in the image printing apparatus by performing appropriate resize processing. The conversion result is temporarily written and stored in the RAM 34.

In step S53, the image-receiving sheet 15 is inserted between the pinch roller 16 and the capstan roller 17. Note that this insertion method may be the manual insertion scheme or the automatic paper feed scheme using a pickup roller and the like. Once the image-receiving sheet 15 is inserted, the image-receiving sheet 15 is fed in a direction A in FIG. 1. When the leading end of the image-receiving sheet 15 is detected by the sensor 14, the conveyance is stopped.

In step S54, N=1 is set to set an initial value for each color ink ribbon to be used. This embodiment will exemplify the case where a color image is printed by using a color sheet. However, a monochrome image may be printed by using a monochrome sheet such as a black or gray sheet.

When a color image is to be printed, image printing is sequentially performed for yellow, magenta and cyan. The processing in steps S55 to S58 is therefore repeatedly executed three times for the respective colors.

Note that when printing is performed by using a monochrome ink ribbon, the processing in steps S55 to S58 may be performed once. To increase the number of types of color ink ribbons to be used, the number of times the processing in steps S55 to S58 is executed may be increased accordingly.

In step S55, the capstan roller 17 is rotated in the reverse direction to the direction in which the capstan roller 17 is rotated in step S53, and moves the image-receiving sheet 15 by a predetermined distance in a direction B in FIG. 1, thereby positioning the start position of the ink ribbon corresponding to the image-receiving sheet 15 when image printing is performed at a predetermined convey speed.

The take-up roller 18 is then driven, and the cueing marker of the yellow ink sheet is detected by the sensor 10, thereby detecting the start position of the ink sheets 12. In this state, the thermal head 11 is separate from the platen 13.

In step S56, the yellow data of the Y, M, and C data determined in step S52 is analyzed by a method to be described later, thus determining a specific convey speed at which an image is to be printed.

In step S57, the data corresponding to one color, i.e., yellow, is written in the buffer memory 35.

In step S58, the arithmetic control unit 32 presses the thermal head 11 against the platen 13, and generates a driving pulse signal having a period corresponding to the determined convey speed. The arithmetic control unit 32 then drives the stepping motor 38 through the motor control unit 37 to convey the image-receiving sheet 15. At the same time, the DC motor is driven to wind the ink sheets 12 around the take-up roller 18 at the same speed. Meanwhile, a one-line density signal in the buffer memory 35 is converted into the number of pulses corresponding to the density.

Figure 4:
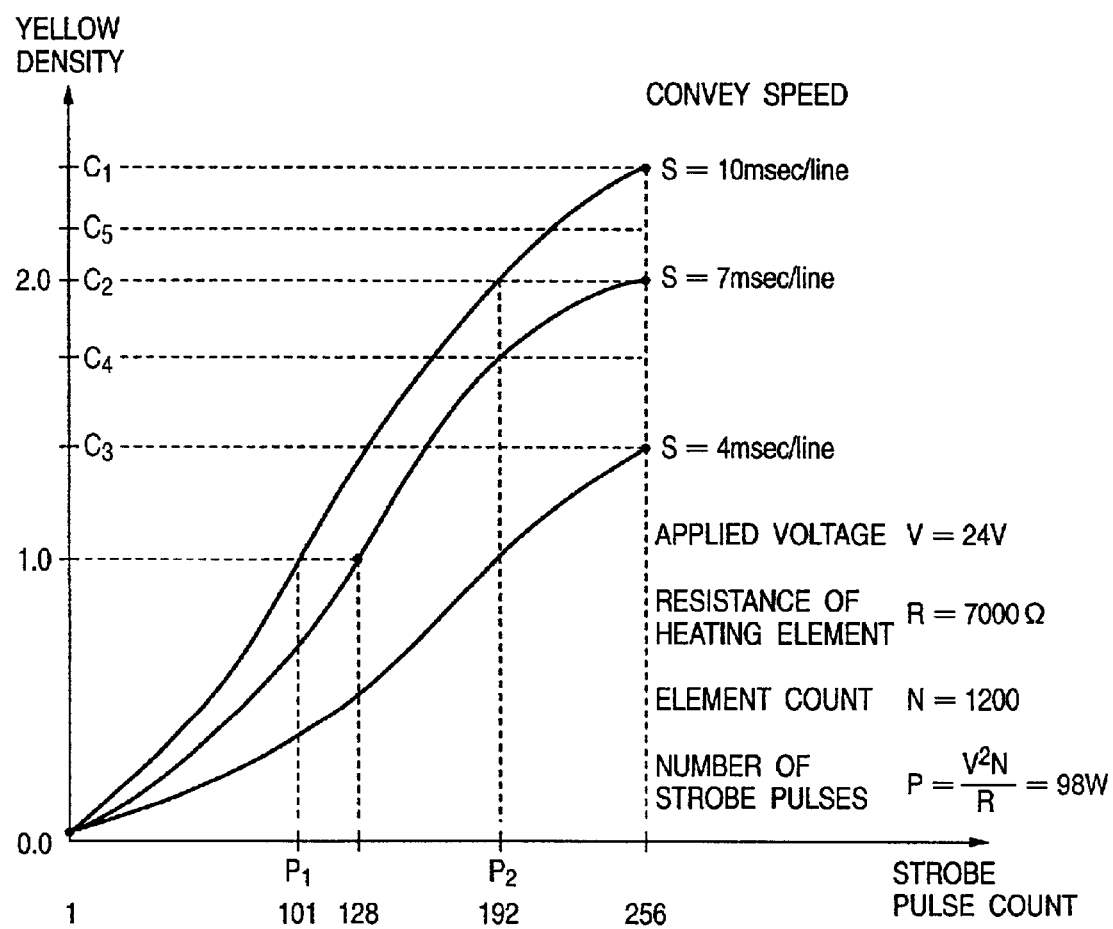
FIG. 4 is a graph showing the relationship between the number of strobe pulses and the density at each convey speed.

The relationship between the number of strobe pulses and the color development density is obtained by experiment in advance to obtain data like that shown in FIG. 4. This data is stored in the form of a table in the ROM 33. The arithmetic control unit 32 converts a density into the number of pulses by looking up this table. As will be described later, this data varies depending on the convey speed. Therefore, this processing and table to be used also vary depending on the convey speed.

The number of strobe pulses are transferred to a shift register provided for each element of the thermal head 11. When a thermal head application voltage is applied to each heating element of the thermal head 11 in synchronism with a strobe pulse determined in this manner, the temperature of each heating element rises, and ink with a desired density is transferred onto the image-receiving sheet 15. In this manner, image printing on a given one line is completed.

The above operation is repeated by the number of times corresponding to the number of lines in the sub-scanning direction, thereby completing image printing with the yellow density.

In step S59, it is checked whether or not cyan image printing is completed. If cyan image printing is not completed, the flow advances to step S60 to set N=N+1 to change the type of ink ribbon to be used. The flow then returns to step S55 to repeat the above processing for magenta and cyan.

If it is determined in step S59 that cyan image printing is completed, the flow advances to step S61 to automatically discharge the image-receiving sheet 15 in the direction B by using a discharge roller (not shown) and the like. The flow then advances to step S62 to terminate the series of operations. Note that the paper discharge processing in step S61 may be configured to be performed manually.

According to the above description, the processing in steps S55 to S58 is performed for each color. However, the present invention is not limited to this embodiment. For example, equivalent processing may be executed by using gray created by mixing yellow, cyan, and magenta.

In this case, a graph similar to the one shown in FIG. 4 which is formed in association with the yellow density, i.e., a graph (not shown) indicating the relationship between a gray density and the number of strobe pulses, may be created in advance. A loop for performing control to select the maximum convey speed common to yellow, cyan, and magenta and suitable for image printing in steps S55 to S58 by using this graph (not shown) and print each of yellow, cyan, and magenta images at the selected convey speed may be added to the flow chart of FIG. 3 or may be formed independently.

[Selection of Convey Speed]

A method of selecting a convey speed in high-speed image printing will be described next.

FIG. 4 is a graph showing the density outputs printed on image-receiving sheets by the sublimation-type image printing apparatus 100 described with reference to FIG. 1 when the number of strobe pulses with a pulse duty of 80% is changed from 1 to 256 while a convey speed S is changed.

FIG. 4 shows, for example, the relationship between the number of strobe pulses and the yellow density when the convey speed S is changed. Although not shown, when other colors such as magenta and cyan are to be used, the number of strobe pulses and the density output of each color printed on an image-receiving sheet with a change in the convey speed S may be measured in advance in the same manner as in FIG. 4.

Referring to FIG. 4, an applied voltage V is 24V, a resistance R of a thermal head heating element is 7kΩ, and an element count N is 1,200. Therefore, a peak power Pmax of a power supply unit which is required to operate 256 strobe pulses with a pulse duty of 80% is given by $$P_{max} = V \times V \times N/R = 98 \text{ W}.$$

Note that as the convey speed increases, the energy to be supplied per unit area decreases, and hence the density decreases.

Assume that 256 strobe pulses are enabled by using the same power (P), and the densities of images that are printed on image-receiving sheets while the convey speed S is changed to 10 msec/line, 7 msec/line, and 4 msec/line are measured. In this case, as indicated by $C_1$, $C_2$, and $C_3$ in FIG. 4, with an increase in the convey speed S (10 msec/line<7 msec/line<and 4 msec/line), the energy supplied per unit area of an image-receiving sheet decreases, and hence the density of an image printed on the image-receiving sheet decreases (C1>C2>C3).

Consider a case where images can be printed at three different convey speeds S, e.g., 10 msec/line, 7 msec/line, and 4 msec/line.

Referring to FIG. 4, owing to the capacity limitation of the power supply unit, the power that can be used for image printing is limited to the maximum peak power Pmax. In FIG. 4, for example, the maximum number of strobe pulses that can be used is limited to 256. For this reason, a maximum density ODM with which an image can be printed at each convey speed is determined.

In the case shown in FIG. 4, the maximum density ODM at a convey speed of 4 msec/line is 1.2 as indicated by $C_3$; the maximum density ODM at a convey speed of 7 msec/line is 2.0 as indicated by $C_2$; and the maximum density ODM at a convey speed of 10 msec/line is 2.2 as indicated by $C_1$.

Under these conditions, in order to print an image (Img) with a yellow density equal to or less than 1.2 indicated by $C_3$, any one of convey speeds of 4, 7, and 10 msec/line can be used by controlling the number of strobe pulses. Therefore, in order to print this image at the maximum convey speed, the maximum convey speed, 4 msec/line, may be used.

To print an image with a yellow density higher than 1.2, e.g., the density indicated by $C_4$, a convey speed of 4 msec/line cannot be used. This is because the maximum density ODM with which an image can be printed at a convey speed of 4 msec/line is the density indicated by $C_3$, and the density indicated by $C_4$ is higher than the density indicated by $C_3$ ($C_4$>$C_3$).

In this case, the convey speed may be changed from the highest convey speed, 4 msec/line, to the next highest convey speed, 7 msec/line.

Likewise, to print an image (img) with a yellow density higher than 2.0 indicated by $C_5$, a convey speed of 10 msec/line may be used.

In this manner, images can always be printed at the highest convey speed selected from the convey speeds which can print the density of images in accordance with the density of images to be printed.

According to the method described above, at least an image with a maximum density equal to or less than a certain value can be printed at high speed while the peak power Pmax is kept constant. In addition, since the peak power Pmax is kept unchanged, there is no need to use any power supply with a high peak power Pmax. Therefore, high-speed image printing can be performed while the manufacturing cost of a power supply unit is suppressed low.

In the above description, the number of different convey speeds that can be set in the image printing apparatus 100 is not limited to three. If a relationship like the one shown in FIG. 4 is checked and registered in advance in association with arbitrary convey speeds, more convey speeds can be used.

[Average Power Consumption]

An average power consumption will be described next.

Ratings that should be observed by the power supply unit include an average consumption power as well as the peak power Pmax.

The peak power Pmax is a standard value that cannot be exceeded even momentarily. The power supply unit may be designed such that an average power consumption within a given period of time (e.g., a period of time during which a one-frame image is printed in one color) becomes equal to or less than a given value (rating) within a range in which the temperature of the power supply does not rise considerably.

Figure 6:
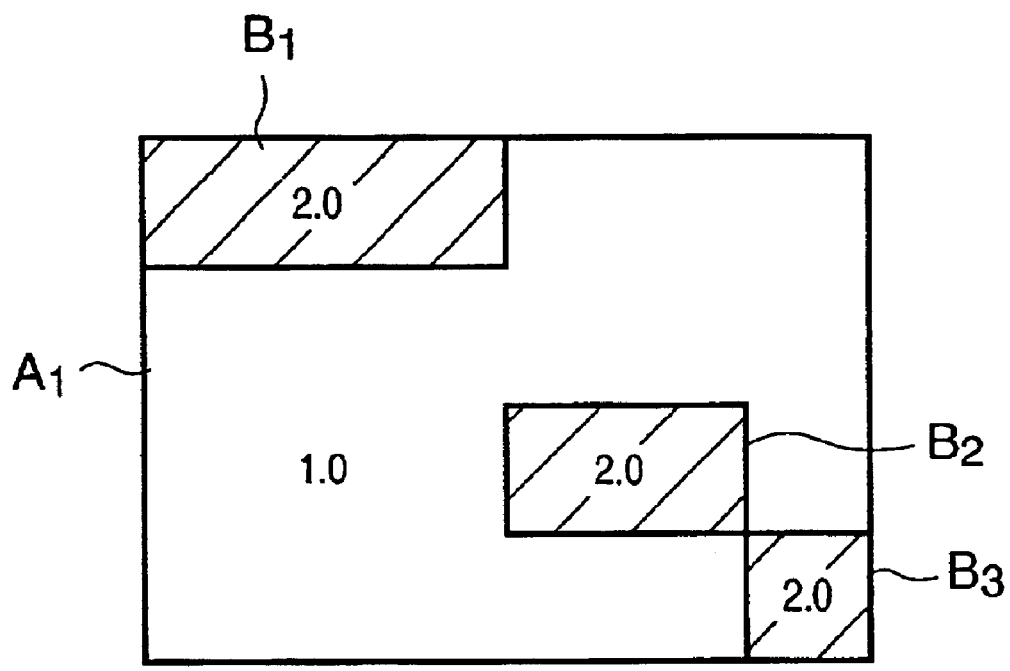
FIG. 6 is a view for explaining the convey speed determination method according to the embodiment of the present invention, in which areas A1 and A2 with the same ink density are calculated.

Assume that the rated average power consumption of the above power supply unit is 50 W, and the image shown in FIG. 6 is printed with yellow densities of 1.0 and 2.0 at a convey speed of 7 msec.

In addition, referring to FIG. 6, assume that letting A1 be the area of the portion with a yellow density of 1.0, and B1, B2, and B3 be the areas of the portions (hatched portions) with a yellow density of 2.0, area with yellow density of 1.0: area with yellow density of 2.0=A1:(B1+B2+B3)=3:1.

Figure 8:
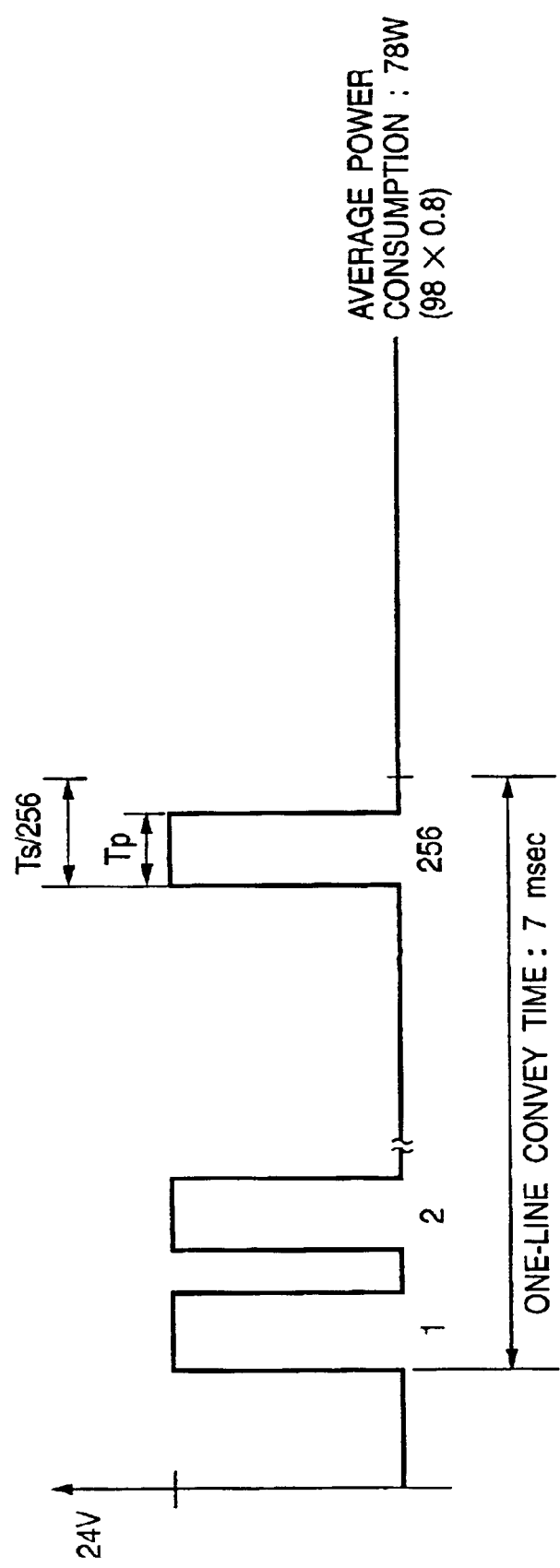
FIG. 8 is a timing chart for explaining the number of strobe pulses and average power consumption that are required to print the portion with the area A2.

In this case, 256 strobe pulses with a pulse duty D=Tp/(Ts/256) of 80% as shown in FIG. 8 are applied to heat elements corresponding to the portion with a yellow density of 2.0 for each line, i.e., for every 7 msec. Therefore, an average power consumption P for the portion with a yellow density of 2.0 is P=98×0.8=78 W because the peak power Pmax is 98 W.

As shown in FIG. 9, 128 strobe pulses are applied to heating elements corresponding to the portion with a yellow density of 1.0 for each line. The average power consumption P for the portion with a yellow density of 1.0 is 39 W.

When, therefore, the above image is printed at a convey speed of 7 msec/line, the average power consumption P for the entire image is P=78×¼+39×¾=49W because area with yellow density of 1.0: area with yellow density of 2.0=3:1, and the average power consumption of the portion with a yellow density of 1.0 and a yellow density of 2.0 are 78 W and 39 W, respectively.

When the image shown in FIG. 6 is to be printed at a convey speed of 7 msec, the average power consumption P becomes 49 W, which falls within a rated average power consumption of 50 W. The image can be printed at this convey speed.

Figure 7:
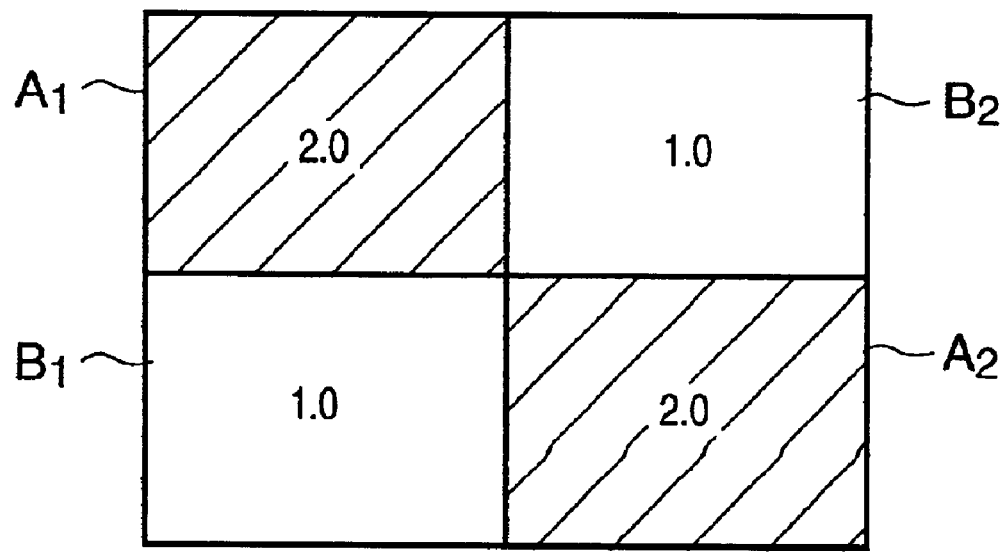
FIG. 7 is a view for explaining the convey speed determination method according to the embodiment of the present invention, in which areas A1 and A2 with the same ink density are calculated.

Assume that the image shown in FIG. 7 is printed with a yellow density of 1.0 and a yellow density of 2.0 at a convey speed of 7 msec/line.

Referring to FIG. 7, assume that letting $A_1$ and $A_2$ be the areas of the portions with a yellow density of 2.0, area with yellow density of 1.0: area with yellow density of 2.0=($A_1$+$A_2$): ($B_1$+$B_2$)=1:1.

When, therefore, the above image is to be printed at a convey speed of 7 msec/line, the average power consumption P for the entire image is P=78×½+39×½=58 W because the average power consumption P with a yellow density of 1.0 and yellow density of 2.0 are 78 W and 39 W, respectively.

When the image shown in FIG. 6 is to be printed at a convey speed of 7 msec/line, the average power consumption P becomes 58 W. This average power consumption P does not exceed the above average power consumption Pmax, 78 W, but exceeds the rated average power consumption of the power supply, 50 W. In this case, the image cannot be printed at this convey speed without any change.

As described above, if the average power consumption exceeds the rated average power consumption, 50 W, of the power supply when an image is printed at a convey speed of 7 msec/line, the convey speed may be decreased by one step to 10 msec/line.

Referring to FIG. 4, when the convey speed is 10 msec/line, strobe pulse counts P1 and P2 that provide yellow densities of 1.0 and 2.0 are 101 and 192, respectively.

The average power consumption corresponding to the portion with a yellow density of 1.0 is $P=78 \times 102/256 = 30.7$ W. The average power consumption corresponding to the portion with a yellow density of 2.0 is $P=78 \times 192/256 = 58.5$ W. Therefore, the average power consumption P corresponding to the image shown in FIG. 9 is $P=(30.7+58.5)/2=44.6$ W.

That is, the average power consumption is 44.6 W when a convey speed of 10 msec/line is used for the image shown in FIG. 6. This value is equal to or less than the rated average power consumption of the power supply, i.e., 50 W, and hence the image can be printed at this convey speed.

As described above, if an image to be printed is analyzed before it is printed, and the convey speed S is determined on the basis of the analysis result, the image can be printed by using various convey speeds S even with a power supply having a low rated average power consumption.

[Convey Speed Selection Method]

The convey speed selection method in step S56 in FIG. 3 will be described in detail below with reference to the flow chart of FIG. 5.

Figure 5:
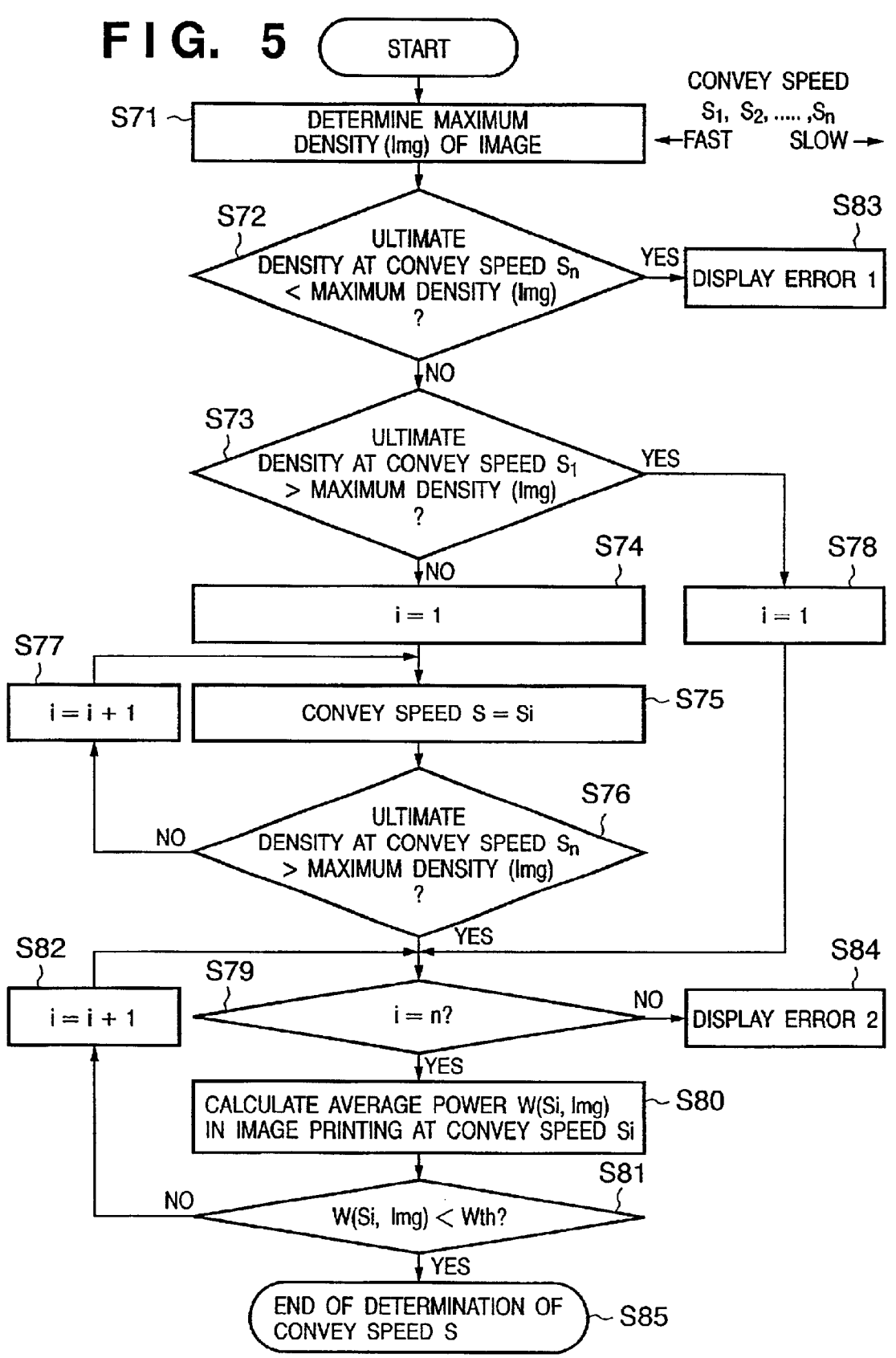
FIG. 5 is a flow chart showing the flow of a convey speed determination method according to the embodiment of the present invention.

Referring to FIG. 5, the processing in steps S71 to S85 is performed for each of the following colors: yellow, magenta, and cyan. For the sake of simplicity, the following description will be given by exemplifying yellow.

In step S71, an image to be printed is scanned to determine the maximum density ODM(Img) of each color required to print the image. This image is a monochrome image of yellow, magenta, or cyan. Assume that the image printing apparatus 100 can set image printing at convey speeds S1, S2, ..., Sn where n is an integer of two or more, S1 is the maximum speed, and Sn is the minimum speed.

In step S72, it is checked whether or not a density ODM(Sn) attained when image printing is performed at the minimum convey speed is lower than the maximum density ODM(Img). If YES in step S72, the flow advances to step S83, it is determined that the image printing apparatus 100 cannot form a desired image, and error 1 is displayed by blinking an appropriate display unit. If it is determined in step S72 that the density ODM(Sn) attained when image printing is performed at the minimum convey speed is equal to or higher than the maximum density ODM(Img), the flow advances to step S73.

If it is determined in step S73 that the density ODM(S1) attained when image printing is performed at the highest convey speed is higher than the maximum density ODM (IMG), the flow advances to step S73 to jump to step S79 upon setting the convey speed to S=S1 without performing the processing in steps S74 to S76.

If it is determined in step S73 that the density ODM(S1) attained when image printing is performed at the highest convey speed is equal to or lower than the maximum density ODM(IMG), the flow advances to step S74 to initialize i to 1. The flow then advances to step S75 to set the convey speed S to Si. The flow then advances to step S76 to compare a density ODM(Si) attained at the convey speed Si with the maximum density ODM(Img).

If it is determined in step S76 that the density ODM(Si) attained at the convey speed Si is equal to or lower than the maximum density ODM(Img), the flow advances to step S77 to set i=i+1. The flow then returns to step S75. The above processing is repeated until a convey speed at which the density ODM(Si) attained by repeating the processing in steps S75 to S77 while the convey speed is decreased step by step becomes higher the maximum density ODM(Img) is found for the first time.

If a convey speed at which the attained density ODM(Si) becomes higher than the maximum density ODM(Img) is found for the first time in step S76, the flow advances to step S79.

Assume that in step S76, data indicating the relationship between strobe pulses and the maximum density that can be attained at each convey speed, e.g., each density shown in FIG. 4, is stored for each ink ribbon in the ROM 33.

In the processing in steps S79 to S82, it is checked whether the average power during image printing is equal to or less than a rated average power consumption Wth of the power supply unit.

In step S79, it is checked whether i is n or not. If i=n, the flow advances to step S80 to calculate an average power consumption W(Si, Img) required to print an image (Img) at the convey speed Si by using data stored in the ROM 33.

That is, the average power consumption W (Si, Img) may be obtained by obtaining a pulse count corresponding to the density of each pixel, obtaining a corresponding power, and adding the power line by line. The result data may be averaged with respect to all lines.

In order to simplify the above computation, an average density may be obtained first, a pulse count that realizes this may then be obtained from corresponding data in FIG. 4 stored in the ROM 33, and the power consumption at this time may be used as the approximate value of the overall average power consumption.

It is checked in step S81 whether or not the calculated average power consumption W (Si, Img) is lower than the rated average power consumption Wth of the power supply unit. If the average power consumption W (Si, Img) is equal to or higher than the rated average power consumption Wth, i=i+1 is set to further decrease the convey speed in step S82. The processing in steps S79 to S81 is then repeated. If the average power consumption W (Si, Img) calculated in step S81 is lower than the rated average power consumption Wth, the flow advances to step S85 to set the convey speed at this time as a convey speed for image printing and terminate the series of operations.

The highest convey speed suitable for image printing is determined by the above method.

Note that if I=N+1 in step S79, the flow advances to step S84 to display error 2 because the power supply unit will be overloaded no matter how slowly an image is printed.

As described above, according to this embodiment, a necessary power can be predicted by segmenting an image to be printed into grayscale-specific areas before printing and accumulating the numbers of printing elements required to print the respective grayscale-specific areas. Therefore, an image can be printed by selecting the highest convey speed from convey speeds at which the upper limit powers and rated average power consumptions are determined on the basis of the predicted powers. This makes it possible to provide an image printing method and apparatus which can realize high-speed image printing.

In this embodiment, a sublimation-type image printing apparatus has been described as an image printing apparatus. However, the present invention can also be applied to a thermal-transfer-type image printing apparatus and the like. In addition, the embodiment has been described on the assumption that images are transferred from a PC (personal computer). However, the embodiment may be configured to have a PC card loaded in a slot or the like so as to read out image data therefrom.

[Other Embodiment]

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium (or recording medium) storing software program codes for realizing the functions of the above-described embodiment to a system or apparatus, and causing the computer (or a CPU or an MPU) of the system or apparatus to read out and execute the program codes stored in the storage medium. In this case, the program codes read out from the storage medium realize the functions of the above-described embodiments by themselves, and the storage medium storing the program codes constitutes the present invention. The functions of the above-described embodiment are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

When the present invention is to be applied to the above storage medium, program codes corresponding to the flow charts (shown in FIGS. 3 and 5) described above are stored in the storage medium.

As has been described above, according to the image printing apparatus of the present invention, an image printing method and apparatus which can realize high-speed image printing without using any large-capacity power supply unit.

As many apparently widely different embodiments of the present invention can be made without departing from the spirit and scope thereof, it is to be understood that the invention is not limited to the specific embodiments thereof except as defined in the appended claims.

What is claimed is:

1. An image printing apparatus that has at least one printhead having a plurality of printing elements, the image printing apparatus comprising:
    storage means for storing a convey speed of a printing medium and a number of strobe pulses for driving at least one printhead, with the convey speed and number of strobe pulses corresponding to an image printing density;
    power predicting means for predicting a power to be supplied to the printhead to print an image on the basis of image data;
    convey speed and strobe pulse selecting means for selecting the convey speed of the printing medium and the number of strobe pulses for driving the printhead on the basis of an image printing density to be achieved by printing and the predicted power; and
    image printing means for printing the image at the selected convey speed and number of strobe pulses.

2. The apparatus according to claim 1, wherein said power predicting means segments the image into grayscale-specific image areas on the basis of the image data, counts a number of printing elements required to print the image areas, and predicts the power from a cumulative value of the number of printing elements obtained for the respective grayscales.

3. The apparatus according to claim 2, wherein the image is a color image printed by using a plurality of inks, and each respective grayscale is divided for the respective types of inks.

4. The apparatus according to claim 2, wherein the image is a color image printed by using a plurality of inks, and the grayscale is a color grayscale formed by mixing the plurality of inks.

5. The apparatus according to claim 1, wherein the at least one printhead is a plurality of identical printheads, and said power predicting means predicts a power for each of the printheads.

6. The apparatus according to claim 1, wherein said convey speed and strobe pulse selecting means includes a register storing an upper limit power used at each respective convey speed, and wherein said convey speed and strobe pulse selecting means selects, from the register, the highest convey speed having an upper limit power which does not exceed the upper limit power to be used.

7. A method of controlling an image printing apparatus that has at least one printhead having a plurality of printing elements, the method comprising the steps of:
    storing a convey speed of the printing medium and a number of strobe pulses for driving the printhead, with the convey speed and the number of strobe pulses corresponding to an image printing density;
    predicting a power to be supplied to the printhead to print an image based on image data;
    selecting the convey speed of the printing medium and the number of strobe pulses for driving the printhead based on an image printing density to be achieved by printing and the predicted power; and
    printing the image at the selected convey speed and number of strobe pulses.

8. The method according to claim 7, wherein, in the power predicting step, the image is segmented into grayscale-specific image areas on the basis of the image data, a number of printing elements required to print the image areas are counted, and the power is predicted from a cumulative value of the numbers of printing elements obtained for the respective grayscales.

9. The method according to claim 8, wherein the image is a color image printed by using a plurality of inks, and each respective grayscale is divided for the respective types of inks.

10. The method according to claim 8, wherein the image is a color image printed by using a plurality of inks, and the grayscale is a color grayscale formed by mixing the plurality of inks.

11. The method according to claim 7, wherein the at least one printhead is a plurality of identical printheads, and said power predicting means predicts a power for each of the printheads.

12. The method according to claim 7, wherein an upper limit power used is registered in said selecting step, and wherein, in said selecting step, the highest convey speed having an upper limit power which does not exceed the power to be used is selected.

13. A computer-readable storage medium storing a program for causing a computer to control an image printing apparatus which has at least one printhead having a plurality of printing elements and storage means for storing a convey speed of a printing medium and a number of strobe pulses for driving the printhead corresponding to an image printing density, the method comprising the steps of:
    predicting a power to be supplied to the printhead to print the image based on image data;
    selecting the convey speed of the printing medium and the number of strobe pulses for driving the printhead based on an image printing density to be achieved by printing and the predicted power; and
    printing the image at the selected convey speed and number of strobe pulses.

14. An image printing apparatus that prints an image on a printing medium comprising:

storage means for storing a convey speed of a printing medium and a number of strobe pulses for driving the printhead, the convey speed and number of strobe pulses corresponding to an image printing density;

conveying means for conveying the printing medium;

convey speed and strobe pulse changing means for changing the convey speed of the printing medium and the number of strobe pulses for driving the printhead; and controlling means for controlling said convey speed and strobe pulse changing means so as to change the convey speed and the number of strobe pulses in accordance with an image density to be printed.

15. The apparatus according to claim 14, wherein the convey speed of the printing medium is slowed as the image density to be printed is increased.

* * * * *

UNITED STATES PATENT AND TRADEMARK OFFICE
CERTIFICATE OF CORRECTION

PATENT NO. : 6,891,556 B2
DATED : May 10, 2005
INVENTOR(S) : Takashi Sasaki et al.

It is certified that error appears in the above-identified patent and that said Letters Patent is hereby corrected as shown below:

Column 1,
Line 36, "a image receiving" should read -- an image-receiving --; and Column 3,
Line 62, "again" should read -- against --.

Column 7,
Line 42, "(img)" should read -- (Img) --.

Column 9,
Line 2, "102/256" should read -- 101/256 --; and
Line 62, "the" should read -- than the --.

Column 11,
Line 28, "which" should be deleted.

Signed and Sealed this

Twenty-second Day of November, 2005

JON W. DUDAS
*Director of the United States Patent and Trademark Office*